(12) United States Patent
Edelhaeuser

(10) Patent No.: US 10,025,704 B2
(45) Date of Patent: Jul. 17, 2018

(54) MEMORY SYSTEM INCLUDING PE COUNT CIRCUIT AND METHOD OF OPERATING THE SAME

(71) Applicant: Crossbar, Inc., Santa Clara, CA (US)

(72) Inventor: Frank Edelhaeuser, Dresden (DE)

(73) Assignee: CROSSBAR, INC., Santa Clara, CA (US)

( * ) Notice: Subject to any disclaimer, the term of this patent is extended or adjusted under 35 U.S.C. 154(b) by 218 days.

(21) Appl. No.: 14/142,720

(22) Filed: Dec. 27, 2013

(65) Prior Publication Data
US 2015/0186258 A1      Jul. 2, 2015

(51) Int. Cl.
*G06F 12/02*      (2006.01)

(52) U.S. Cl.
CPC ...... *G06F 12/0246* (2013.01); *G06F 12/0238* (2013.01); *G06F 2212/7211* (2013.01)

(58) Field of Classification Search
CPC ............. G06F 12/0238; G06F 12/0246; G06F 2212/7211
See application file for complete search history.

(56) References Cited

U.S. PATENT DOCUMENTS

2010/0177564 A1\* 7/2010 Feeley ................ G06F 11/1068
                                                                365/185.09
2010/0274952 A1\* 10/2010 Lee ..................... G06F 12/0246
                                                                711/103

\* cited by examiner

*Primary Examiner* — Yong Choe
(74) *Attorney, Agent, or Firm* — Amin, Turocy & Watson, LLP

(57) ABSTRACT

A memory system includes a memory device. The memory device includes a substrate. A memory array defines a plurality of pages, each page including a data area for storing data and a spare area for storing a program/erase (PE) count value, the PE count value indicating a number of PE cycles performed on the page. A PE count circuit is configured to perform a PE count read operation on a target page. A host determines whether to perform a data write operation on the target page or another PE count read operation on a new target page based on a result of the PE count read operation. PE cycles of a page are controlled by the PE count read operation. The memory array and the PE count circuit are formed in different layers of the substrate.

21 Claims, 13 Drawing Sheets

MEMORY SYSTEM INCLUDING PE COUNT CIRCUIT AND METHOD OF OPERATING THE SAME

BACKGROUND

The present invention relates to a memory system including a program/erase (PE) count circuit and a method of operating the same.

The assignee of the present patent application has focused its attention to resistive memory cells, believing its use as a resistive random-access memory (RRAM) could be an excellent candidate for ultra-high density non-volatile information storage. A typical resistive memory cell studied has an insulator layer provided between a pair of electrodes and exhibits electrical pulse induced hysteretic resistance switching effects.

The non-volatile characteristics and simple configuration enables the additional exploration of the resistive memory cell to be implemented in a wide range of different applications. In addition, the assignee is developing CMOS friendly fabrication processes such that the RRAM can be manufactured on top of CMOS logic.

From the above, an RRAM device has been introduced as a new semiconductor device structure. In the RRAM device, since the number of program/erase (PE) cycles a memory cell can perform before becoming unreliable is limited, data should be arranged such that program/erase (i.e., write) operations are evenly spread across all locations in the RRAM device. This technique is called "wear leveling."

SUMMARY

Embodiments of the present invention relate to a memory system for performing wear leveling using an automatically updated program/erase (PE) count value stored in a spare area of a memory array without any host intervention.

In an embodiment, a memory system includes a memory device. The memory device includes a substrate. A memory array defines a plurality of pages, each page including a data area for storing data and a spare area for storing metadata such as a program/erase (PE) count value. A PE count circuit is configured to receive a PE count value retrieved from a spare area of a target page and compare the retrieved PE count value with a threshold value. According to the comparison result, whether or not to write data into the data area of the target page is determined. The memory array and the PE count circuit are formed in different layers of the substrate.

The memory device further comprises a control layer; and a memory layer provided on top of the control layer. The PE count circuit is formed in the control layer and the memory array is formed in the memory layer.

In an embodiment, a memory device includes a memory device, the memory device including a substrate, a memory array defining a plurality of pages, each page including a data area for storing data and a spare area for storing a program/erase (PE) count value, the PE count value indicating a number of PE cycles performed on the page, and a PE count circuit configured to perform a PE count read operation on a target page to enable a host to determine whether or not to perform a data write operation on the target page based on a result of the PE count read operation, wherein the memory array and the PE count circuit are formed in different layers of the substrate.

In another embodiment, a method of operating a memory system includes receiving an address identifying a target page in a memory array, performing a program/erase (PE) count read operation on the target page to retrieve a PE count value stored in a spare area of the target page and comparing the retrieved PE count value with a threshold value, the PE count value indicating a number of PE cycles performed on the target page, and updating the retrieved PE count value and writing write data into a data area of the target page and the updated PE count value into the spare area of the target page, respectively.

The details of one or more embodiments are set forth in the accompanying drawings and the description below. Other features, objects, and advantages will be apparent from the description and drawings, and from the claims.

BRIEF DESCRIPTION OF THE DRAWINGS

Embodiments will hereinafter be described in conjunction with the appended drawings, wherein like designations denote like elements, and wherein.

DETAILED DESCRIPTION

The present invention relates to memory devices. An embodiment relates to a memory device that performs a program/erase (PE) count read operation using an automatically updated PE count value stored in a spare area of a memory array without any host intervention.

Figure 1:
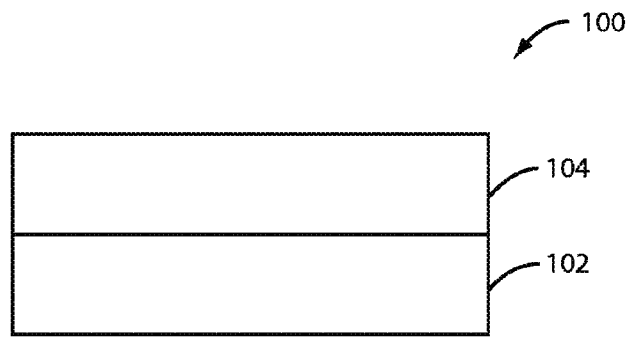
FIG. 1 illustrates a memory device according to an embodiment of the present invention.

FIG. 1 illustrates a memory device 100 according to an embodiment of the present invention. The device 100 includes a control structure 102 and a memory structure 104 provided on top of the control structure 102. Although the control structure 102 and the memory structure 104 are illustrated as a single layer, each structure may include multiple layers. The memory structure 104 includes memory cells that are configured to store data. The memory cells can be non-volatile memory cells (e.g., resistive memory cells or Flash memory cells) or volatile memory cells according to implementation. The memory cells may also be two-terminal cells or three terminal cells. In an embodiment, the memory cells in the memory structure 104 are two-terminal resistive memory cells. The control structure 104 includes metallization and circuitry for reading and writing the memory cells in the memory structure 104. Two structures 102 and 104 are typically interconnected using a plurality of vias.

Figure 2:
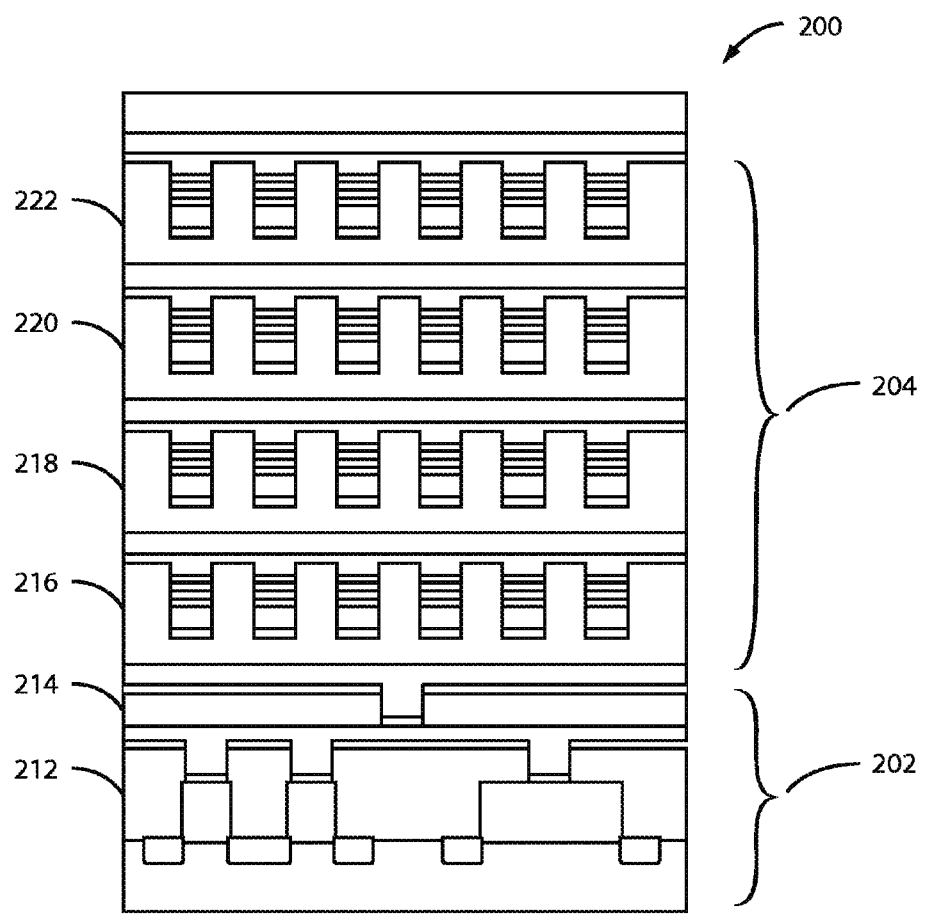
FIG. 2 illustrates a two-terminal nanoscale resistive random-access memory (RRAM) device according to an embodiment.

FIG. 2 illustrates a two-terminal nanoscale resistive random-access memory (RRAM) device 200 according to an embodiment of the present invention. The RRAM device 200 is a two-terminal device having a switching medium provided between top and bottom electrodes. The resistance of the switching medium can be controlled by applying an electrical signal to the electrodes. The electrical signal may be current-based or voltage-based. As used herein, the term "RRAM" or "resistive memory device" refers to a memory device that uses a switching medium whose resistance can be controlled by applying an electrical signal without ferroelectricity, magnetization or phase change of the switching medium. In various embodiments, the memory device 200 is filament-based.

As used herein, the term "nanoscale" or "nanostructure" refers to a structure having at least one dimension in the nanoscale range. For example, a nanostructure includes a structure having a diameter or plural cross-sectional dimensions within the general range of 0.1 to 200 nanometers. This includes structures having all three spatial dimensions in the nanoscale, such as a cylindrical nanocolumn or nanopillar having a length that is on the same order as its nanoscale diameter. In light of the present patent disclosure, it will be understood by one of ordinary skill in the art that various embodiments include nanoscale structures such as nanotubes, nanowires, nanorods, nanocolumns, nanopillars, nanoparticles, nanofibers, or the like.

The RRAM device 200 includes a control structure 202 and a memory structure 204. In an embodiment, the control structure 202 includes two layers 212 and 214 of metallization for routing read, write, and other operational signals to the memory structure 204, although a different number of layers may also be used. In an embodiment, the memory structure 204 includes four layers 216, 218, 220, and 222 of memory cells, although a different number of layers may also be used. In an embodiment, the memory cells are arranged in a crossbar array structure, where each intersection of the crossbar array structure defines a memory cell. Each memory cell has $4F^2$ configuration in an implementation.

Figure 3:
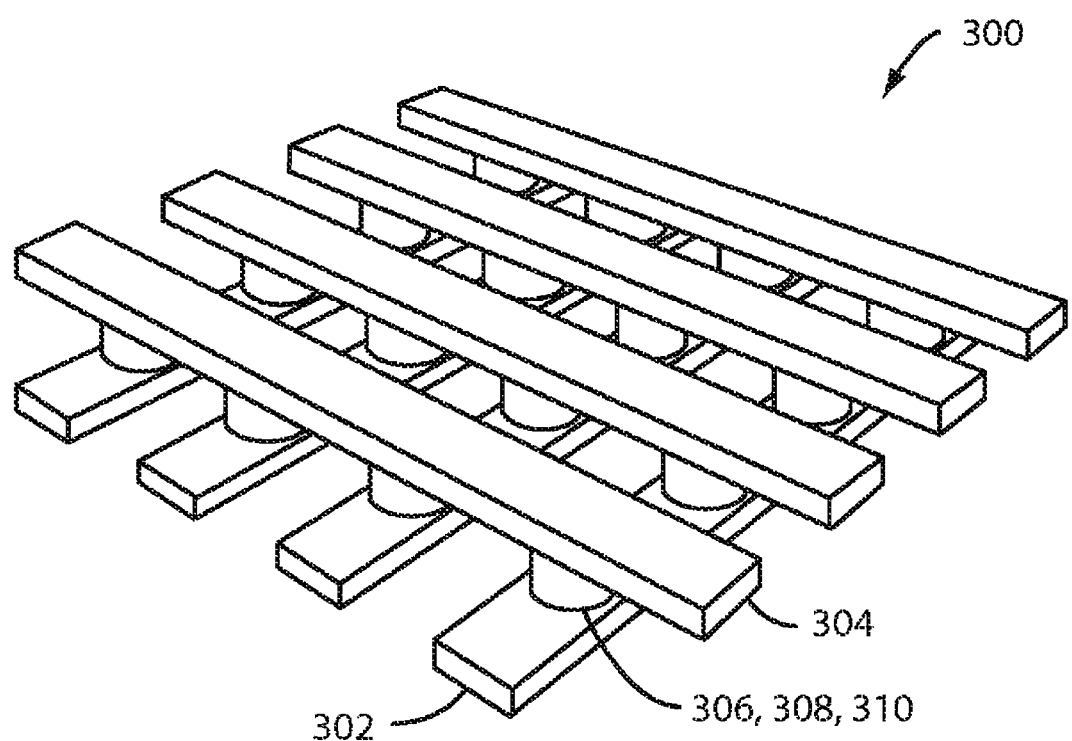
FIG. 3 illustrates a crossbar memory array according to an embodiment.

FIG. 3 illustrates a crossbar memory array 300 according to an embodiment. In particular, FIG. 3 illustrates a three-dimensional view of a single layer of a crossbar memory. The crossbar memory 300 includes a parallel array of bottom electrodes 302 extending along a first direction. In an embodiment, the bottom electrodes 302 include a metal and a doped semiconductor layer formed on the metal. The bottom electrodes 302 are nanostructures in an embodiment. For example, the bottom electrodes 302 have a width of about 40 nm and a pitch of about 60 nm.

A parallel array of top electrodes 304 extends along a second direction to intersect with the bottom electrodes 302. The top electrodes 304 include a metal capable of supplying filament-forming metal particles such as silver (Ag), titanium (Ti), gold (Au), nickel (Ni), aluminum (Al), chromium (Cr), iron (Fe), manganese (Mn), tungsten (W), vanadium (V), and cobalt (Co). In an embodiment, the top electrodes 304 and the bottom electrodes 302 are orthogonal to each other, although they may also be set at a non-orthogonal angle. The top electrodes are nanowires having a width of about 20~100 nm and a pitch of about twice the width of the nanowire, in some embodiments.

Typically, intersections 306 of the two arrays define a two-terminal resistive memory cell 308. The memory cell 308 at each intersection 306 includes top (304) and bottom (302) metals separated by a switching layer 310. In an embodiment, the switching layer 310 includes an atomic-level switching medium. The switching structure may have a width that is the same as or narrower than that of the bottom electrode 302. In some embodiments, each memory cell in a crossbar memory array stores a single bit. In other embodiments, the memory cells exhibit multi-level resistance states, thereby allowing storage of a plurality of bits in each cell.

The crossbar memory array 300 as described above may be fabricated on a silicon substrate with control circuits in an embodiment. In another embodiment, III-V type semiconductor compounds, such as Gallium Arsenide GaAs, Gallium Nitride GaN, Boron Nitride BN, etc., or II-VI type semiconductor compounds, such as Cadmium Selenide, Zinc Telluride, etc., may also be used as the substrate.

FIG. 3 illustrates an embodiment of the present invention. In other embodiments, other configurations of the crossbar memory array 300 may be used, such as those described in co-pending application Ser. No. 13/189,401, filed on Jul. 22, 2011, and Ser. No. 13/149,757, filed on May 31, 2011, which are incorporated by reference herein, for all purposes.

Figure 4:
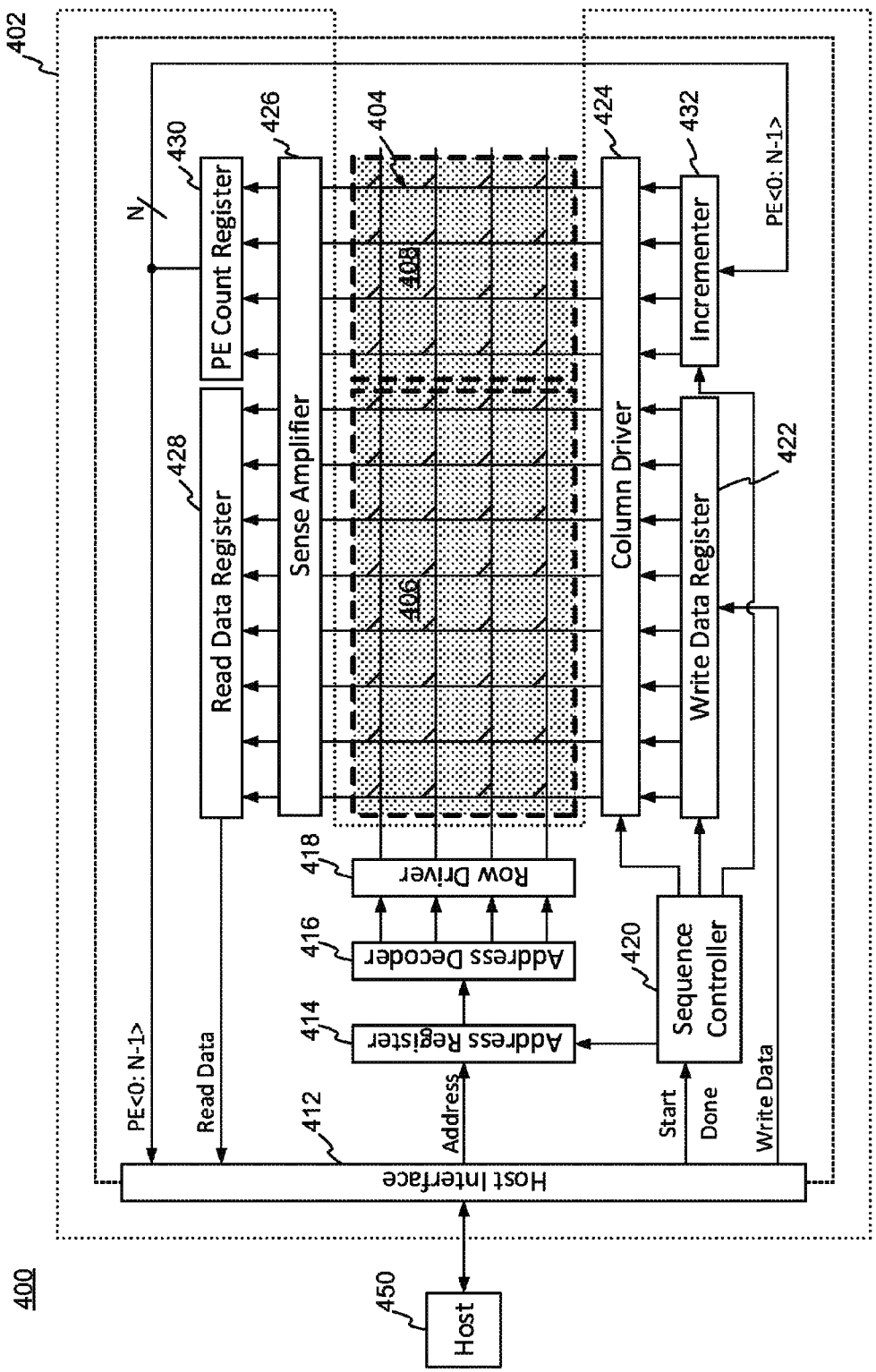
FIG. 4 illustrates a block diagram of a RRAM device according to a first embodiment.

FIG. 4 illustrates a block diagram of a RRAM device 400 according to a first embodiment. The RRAM device 400 includes a control structure 402 and a memory structure 404. Although these two structures are illustrated on the same plane, the control structure 402 and the memory structure 404 may be implemented on different fabrication planes.

In an embodiment, the control structure 402 is provided below the memory structure 404, as shown in FIG. 2. The control structure 402 includes circuitry to control operations performed on memory cells in the memory structure 404. The memory cells in the memory structure 404 may be arranged in one or more memory arrays, as illustrated in FIG. 3. In an implementation, the memory structure 404 includes RRAM cells that are disposed in a data area 406 and a spare area 408, but other types of cells may be used in other implementations.

The control structure 402 includes a host interface 412 to communicate with a host 450. The host 450 can be any number of devices, e.g., CPU, computer, tablet, cell phone, GPU, or the like. The host interface 412 receives read and write commands from the host 450 and sends suitable control information to other components in the RRAM device 400 in order to execute the commands received. The host interface 412 also transmits an address and write data from the host 450 to an address register 414 and a write data register 422, respectively, in the RRAM device 400. The host interface 412 subsequently sends data, information, or results obtained from the memory structure 404 to the host 450.

The address register 414 receives an address from the host interface 412. An address decoder 416 receives address information from the address register 414 and decodes the address information. A row driver 418 receives the decoded address information and selects a row of memory cells. A row of memory cells is referred to herein as a page. The address is used to identify a target page to perform, e.g., a program/erase (PE) (or re-write) count read operation. In the PE count read operation, a PE count value stored in a spare area of the target page is read out to the host 450.

The write data register 422 receives the write data from the host interface 412 when a write command is enabled. The write data is written into a data area of the target page corresponding to an address via a column driver 424 when a page write operation is performed on the target page according to a result of the PE count read operation.

A sequence controller 420 receives a start command from the host interface 412 when an operation is to be performed. In an implementation, the sequence controller 420 receives the start command at substantially the same time the address register 414 receives the address from the host interface 412. The start command (or enable signal) alerts the sequence controller 420 that an operation (e.g., PE count read operation or page write operation) is to start. In some embodiments, the sequence controller 420 drives an operation of identifying the target page on which the PE count read operation is to be performed.

A PE count register 430 receives an N-bit PE count value retrieved from the spare area 408 of the memory structure 404 via a sense amplifier 426 when the PE count read operation is executed on the target page. The PE count register 430 outputs a PE count value PE<0:N−1> to the host interface 412. In an embodiment, at the time of the production of the RRAM device 400, the PE count value PE<0:N−1> is initialized to zero. The PE count value PE<0:N−1> is incremented by 1 whenever the page write operation is performed on the target page. The number N is a positive integer and determined so that it corresponds to a number of bits needed to store the maximum allowed PE (or re-write) count value, which is determined by an endurance specification of the RRAM device 400.

After that, the host interface 412 transmits the PE count value PE<0:N−1> to the host 450. The host 450 determines whether or not to transmit a write command to the target page inside the RRAM device 400 based on the PE count value PE<0:N−1>. In an embodiment, the host 450 compares the PE count value PE<0:N−1> with a threshold value that is determined based on the reliability of the memory cell. The threshold value may be determined by the endurance specification of the RRAM device 400. The threshold value may correspond to the maximum number of PE cycles the memory cell can perform.

In an embodiment, if the PE count value PE<0:N−1> outputted from the PE count register 430 is smaller than the threshold value, the host 450 transmits the write command to the RRAM device 400 so that write data stored in the write data register 422 is written into the data area of the target page. On the other hand, if the PE count value PE<0:N−1> is equal to or larger than the threshold value, the host 450 transmits the next address to the RRAM device 400. The address register 414 receives the next address from the host interface 412 to identify a new target page, and the next PE count read operation is performed on the new target page.

An updater including an incrementer 432 automatically increments the PE count value PE<0:N−1> output from the PE count register 430 by '1' if the page write operation is determined to be performed on the target page, and thus the sequence controller 420 triggers the incrementer 432. The incremented PE count value is stored in the spare area of the target page as an updated current PE count value when the write data is written in the data area of the target page. The PE count value PE<0:N−1> represents the number of PE cycles performed on the target page.

When the target page is selected, and thus the N-bit PE count value stored in the spare area of the target page is retrieved and provided to the PE count register 430, data stored in the data area of the target page is also read out and sensed and amplified by the sense amplifier 426. The amplified data is stored in a read data register 428, but is not read out to an external device.

As described above, according to a standard write sequence, the host 450 sends an address and write data into the address register 414 and the write data register 422, respectively. After that, the host 450 triggers a page write operation, and thus the sequence controller 420 turns into a page read operation (at least a part of the target page, i.e., the spare area 408) followed by the page write operation on the target page. As a result, the PE count value for the target page is automatically incremented without any software interaction.

In an embodiment, the address register 414, the sequence controller 420, the write data register 422, the PE count register 430, and the incrementer 432 are all implemented as hardware in the control structure 402 in order to speed up the operation. All these hardware components are typically provided directly below the memory structure 404, as shown in FIG. 1. However, in other embodiments, the hardware components may be provided between memory structures 404.

Figure 5:
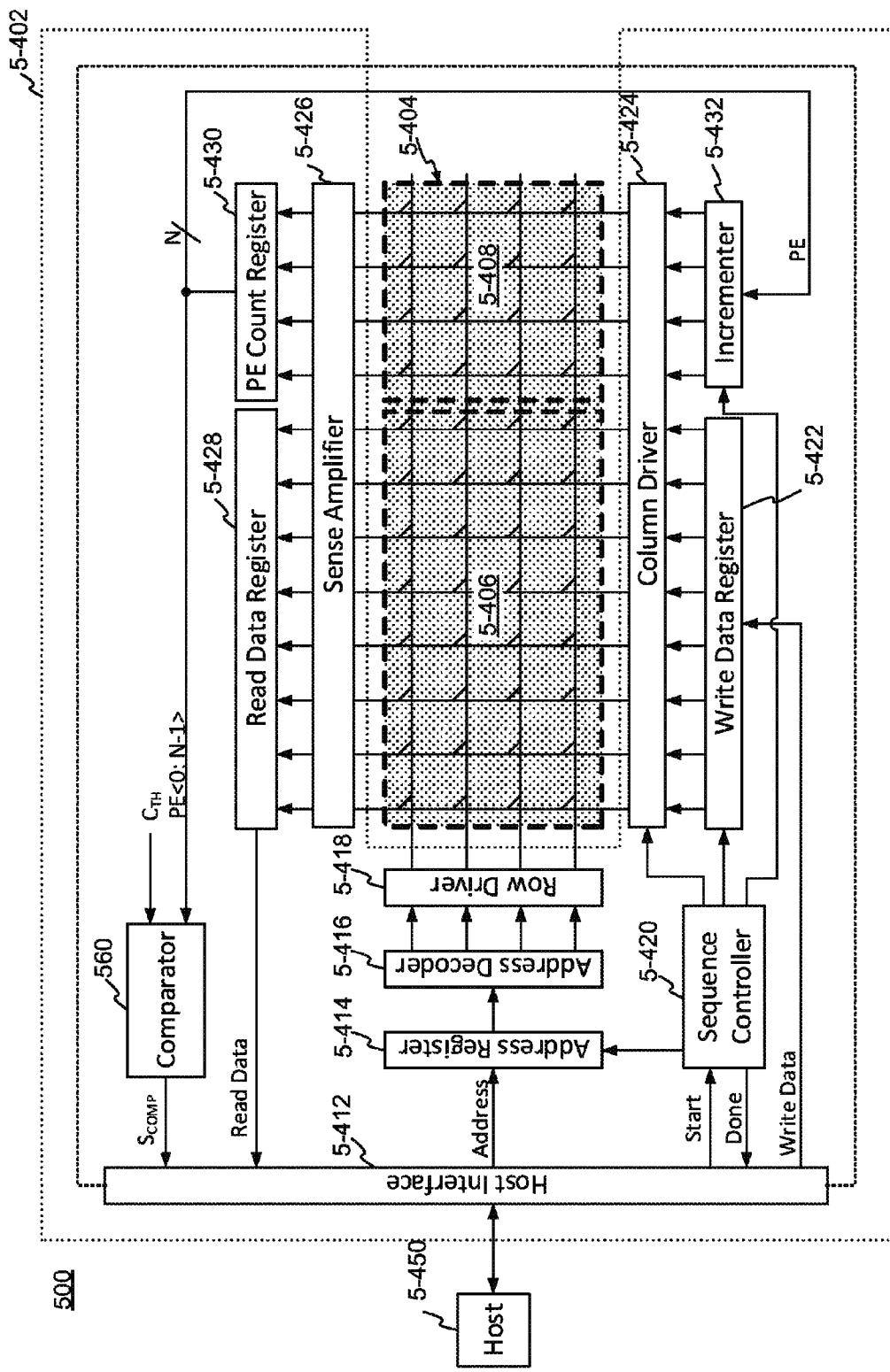
FIG. 5 illustrates a block diagram of a RRAM device according to a second embodiment.

FIG. 5 illustrates a block diagram of a RRAM device 500 according to a second embodiment. The RRAM device 500 includes a comparator 560 in addition to the components shown in FIG. 4.

In this embodiment, the comparator 560 is added to the control structure 5-402. The comparator 560 compares the PE count value PE<0:N−1> output from the PE count register 5-430 with a threshold value $C_{TH}$, and thus a comparison signal $S_{COMP}$ is transmitted to the host 5-450 via the host interface 5-412. As a result, the host 5-450 determines whether or not to transmit a write command or the next address for identifying a new target page to the RRAM device 500 in response to the comparison signal $S_{COMP}$. The threshold value $C_{TH}$ is determined in the same manner as in the embodiment shown in FIG. 4.

In an embodiment, if the comparison signal $S_{COMP}$ has a logic high level, the host 5-450 provides the next address to the RRAM device 500 to perform the next PE count read operation. On the other hand, if the comparison signal $S_{COMP}$ has a logic low level, the host 5-450 transmits the write command to the RRAM device 500 so that write data stored in the write data register 5-422 is written into the data area of the target page and the incremented PE count value is stored in the spare area of the target area. The configuration and operations of other components in FIG. 5 are substantially the same as corresponding components in FIG. 4, and thus their detailed description is omitted herein for the simplicity of explanation.

Figure 6:
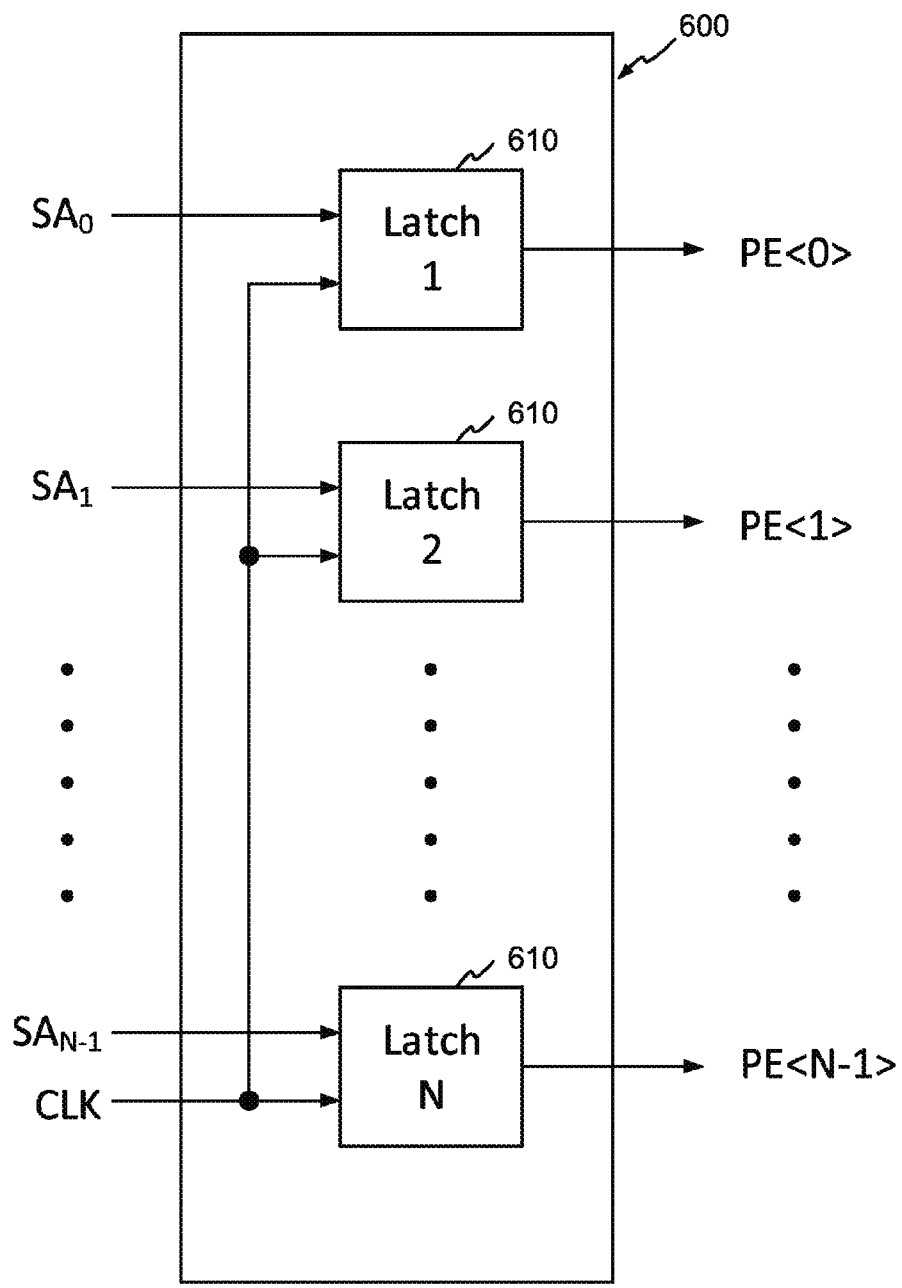
FIG. 6 illustrates a PE count register according to an embodiment.

FIG. 6 illustrates a PE count register 600 according to an embodiment. The PE count register 600 includes a plurality of flip-flop type latches 610 as storage elements. The plurality of flip-flop type latches 610 receives N-bit sense amplified results $SA_0$ to $SA_{N-1}$ that are obtained by reading out an N-bit PE count value from a spare area of a target page and sensing and amplifying the read-out PE count value using the sense amplifier 426 (or 5-426), and latches and outputs the received N-bits in response to a clock CLK which the sequence controller 5-420 activates at the end of the read phase. The latched N-bits are output to the host interface 412 or the comparator 560 as the PE count value PE<0:N−1>.

Figure 7:
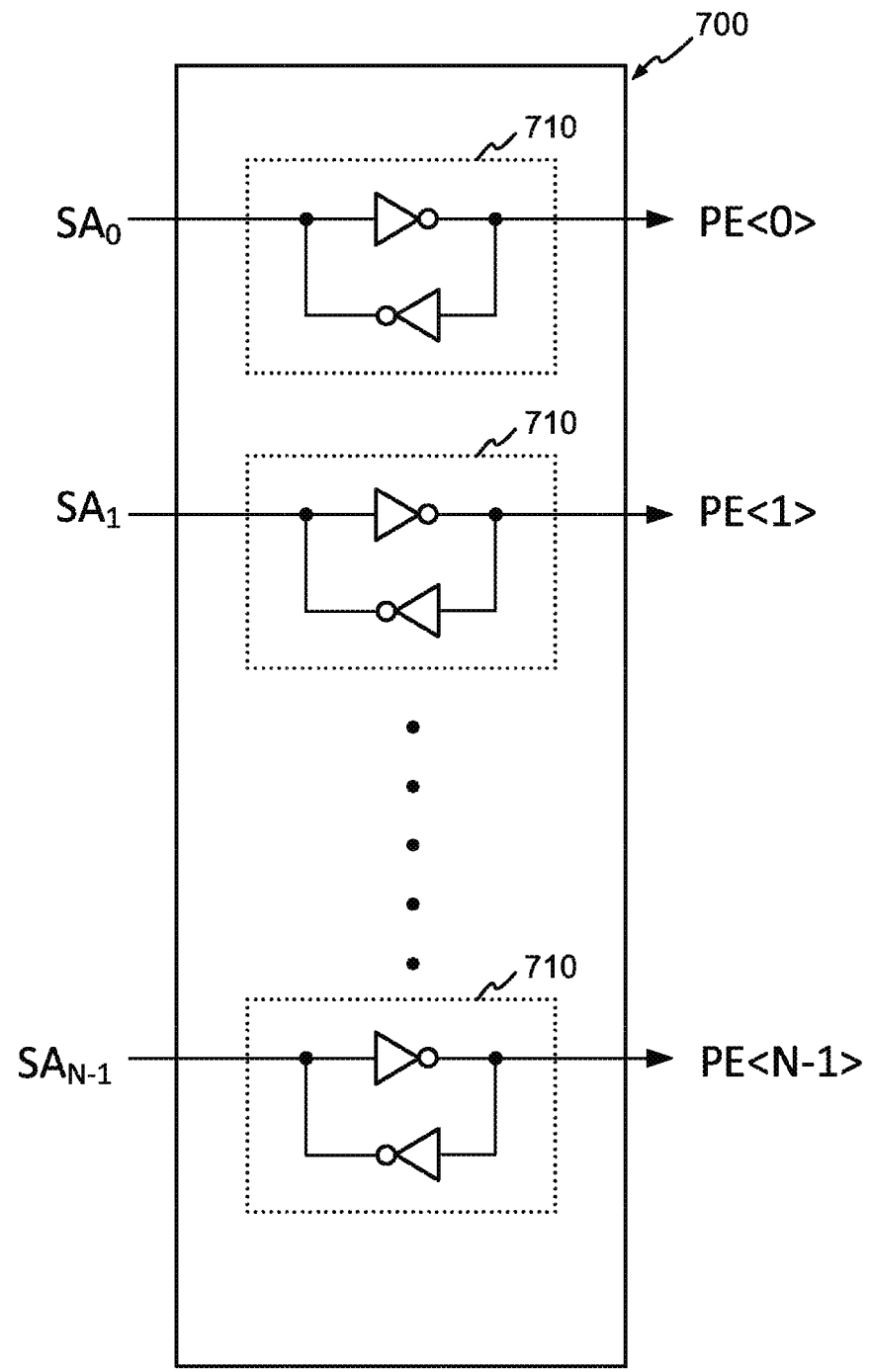
FIG. 7 illustrates a PE count register according to another embodiment.

FIG. 7 illustrates a PE count register 700 according to another embodiment. The PE count register 700 includes a plurality of inverter type latches 710. The plurality of latches 710 receives N-bit sense amplified results $SA_0$ to $SA_{N-1}$ from the sense amplifier 426 (or 5-426), and latches the received N-bits. The latched N-bits are output to the host interface 412 or the comparator 560 as the PE count value PE<0:N−1>. Each latch 710 includes two inverters in which an output node of a first inverter is coupled to an input node of a second inverter and an output node of the second inverter is coupled to an input node of the first inverter. However, one of skill in the art will understand that embodiments of the present invention are not limited to the flip-flop type latch or the inverter type latch illustrated in FIGS. 6 and 7, respectively.

Figure 8:
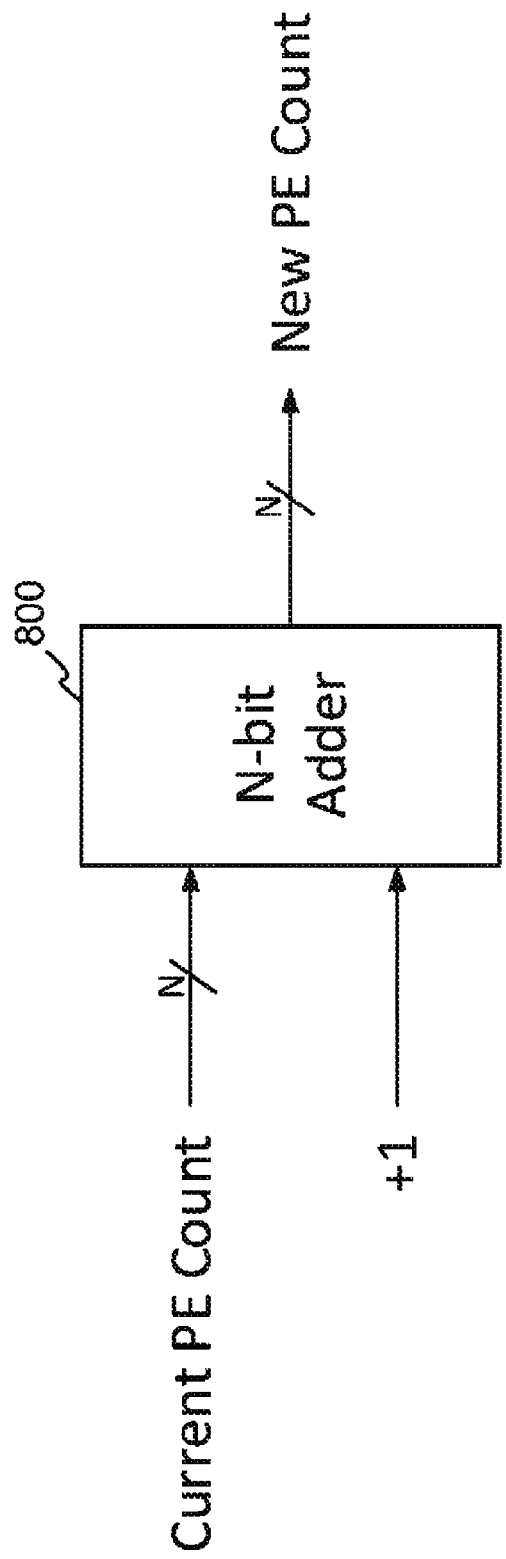
FIG. 8 illustrates an incrementer according to an embodiment.

FIG. 8 illustrates an updater according to an embodiment. The updater is implemented with an N-bit adder 800 that increments a current PE count value, i.e., the PE count value PE<0:N−1> output from the PE count register 430 (or 5-430), by '1', and outputs a new PE count value, i.e., an updated PE count value that is 1 larger than the current PE count value.

In another embodiment, the updater includes a saturating counter maxing out at a count value that is 1 larger than the maximum number of PE cycles of a memory cell determined by the endurance specification of the RRAM device. Thus, if the PE count value reaches the maximum count value, it indicates that memory cells of the target page reach the end of their lifetime. As a result, a write operation is not performed on the target page anymore.

Figure 9:
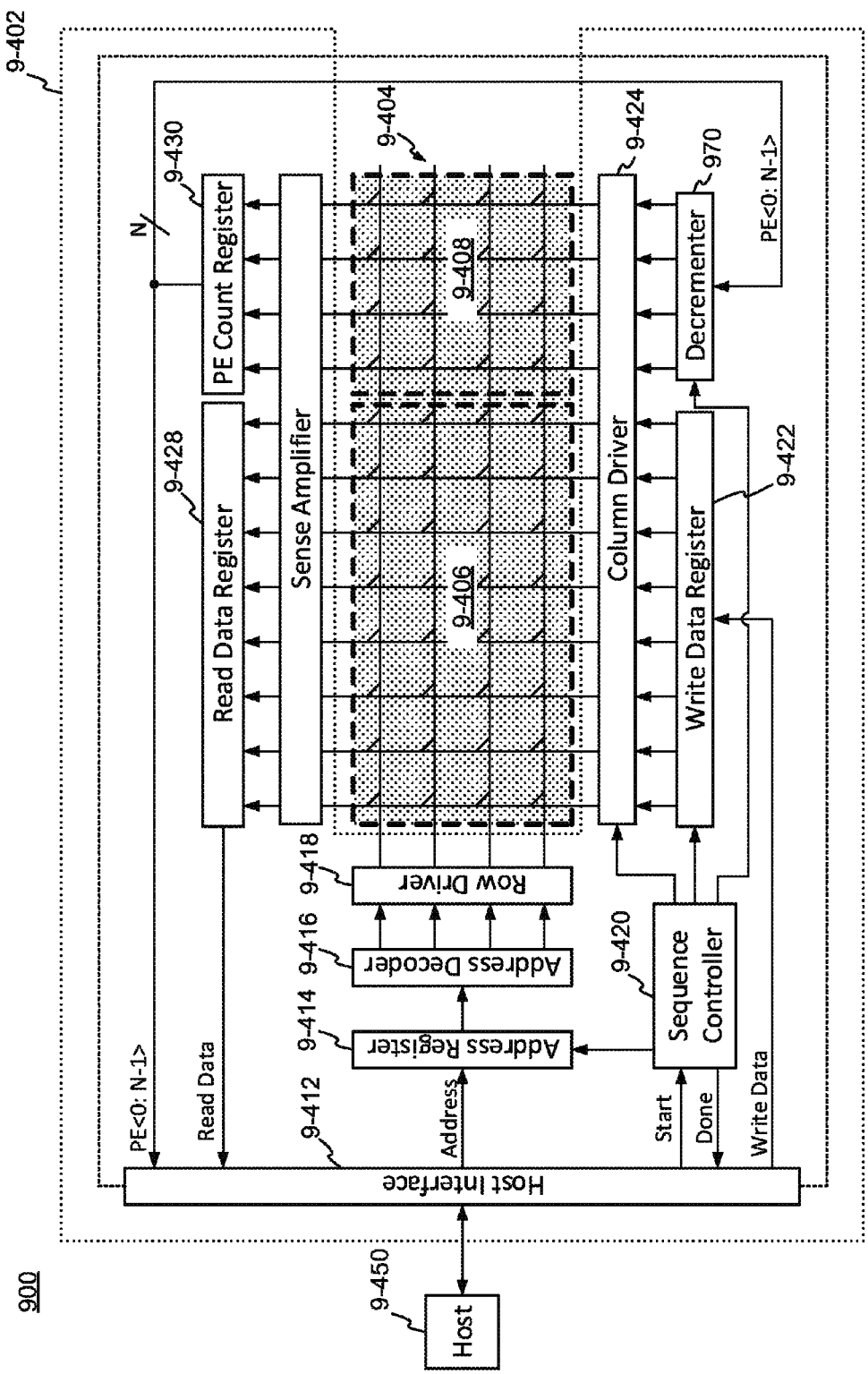
FIG. 9 illustrates a block diagram of a RRAM device according to a third embodiment.

FIG. 9 illustrates a block diagram of a RRAM device 900 according to a third embodiment. The RRAM device 900 includes an updater including a decrementer 970 instead of the incrementer 432 shown in FIG. 4. Other components, e.g., an address register 9-414, a sequence controller 9-420, a write data register 9-422, and a PE counter register 9-430, of the RRAM device 900 are substantially the same as corresponding components of the RRAM device 400 illustrated in FIG. 4. In this embodiment, at the time of the production of the RRAM device 900, a PE count value stored in a spare area 9-406 corresponding to each page is initialized to a maximum allowed PE (or re-write) count value. Thus, the PE count value PE<0:N−1> is decremented by '1' whenever a write operation is performed on the target page. The maximum allowed PE count value may correspond to the maximum number of PE cycles of a memory cell that is determined by the endurance specification of the RRAM device.

In an embodiment, as in the RRAM device 400, the PE count value PE<0:N−1> output from the PE count register 9-430 is transmitted to a host 9-450 via a host interface 9-412, and the host 9-450 compares the PE count value PE<0:N−1> with a threshold value. In an embodiment, the threshold value is zero. The host 9-450 determines whether or not to transmit a write command or the next address to the RRAM device 900 based on a result of the comparison.

Even though not shown, in another embodiment, as in the RRAM device 500, the PE count value PE<0:N−1> output from the PE count register 9-430 is transmitted to a comparator implemented in the control structure 9-402, and compared with the threshold value, e.g., zero. After that, if a comparison signal is inputted thereto, the host 9-450 determines whether or not to transmit the write command or the next address to the RRAM device 900 in response to the comparison signal. The configuration and operations of other components in FIG. 9, not described above, are substantially the same as corresponding components shown in FIG. 4 or 5, and thus their detailed description is omitted herein for the simplicity of explanation.

Detailed operations of the RRAM devices disclosed herein will be described later with reference to FIGS. 11 to 13.

Figure 10:
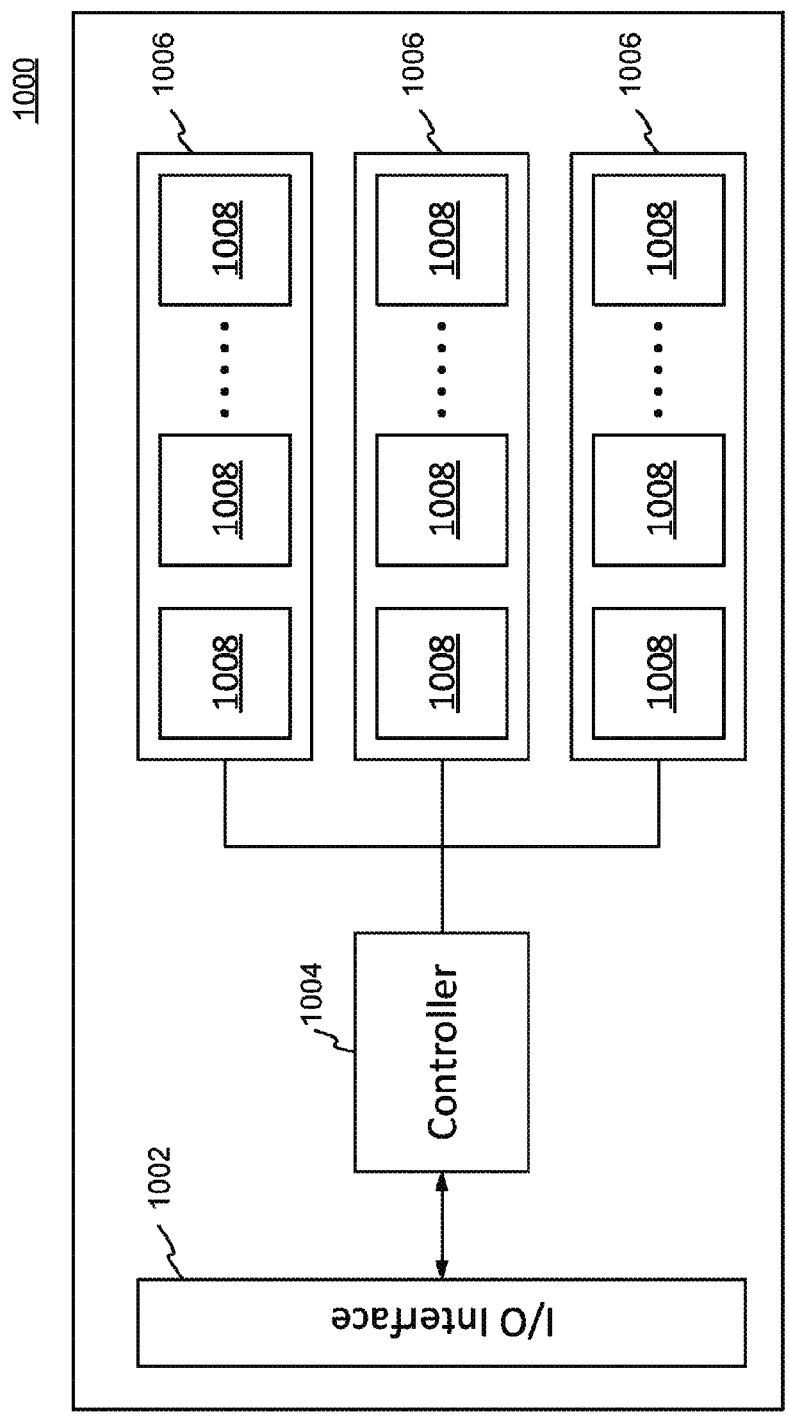
FIG. 10 illustrates a solid-state drive (SSD) including a plurality of memory devices (e.g., RRAM devices) according to an embodiment.

FIG. 10 illustrates a solid-state drive (SSD) 1000 including a plurality of solid state devices (e.g., RRAM devices) according to an embodiment. The SSD 1000 includes an I/O interface 1002 that interfaces with an external device (not shown), such as a computer or other computing device. The I/O interface 1002 may replicate an HDD environment. The I/O interface 1002 may be Serial ATA, Serial attached SCSI, PCI Express, Fibre Channel, USB, Parallel ATA, MMC, eMMC, SDCARD, UFS, or the like. A SSD controller 1004 controls operations of the SSD 1000 and includes a CPU and other components. One or more memory modules 1006 store data for the SSD 1000.

In an embodiment, the memory modules 1006 includes one or more RRAM devices 1008. The RRAM device 1008 corresponds to the RRAM device 400, 500, or 900 and the SSD controller 1004 corresponds to the host 450, 5-450, or 9-450 of FIG. 4, 5, or 9. A row of memory cells in the RRAM device 1008 defines a page that has a data area and a spare area. Data is stored in the data area and metadata is stored in the spare area. The metadata includes logical page address for the page, wear leveling data including a PE count value, and the like. A PE count read operation and other lookup operations are performed at the RRAM device 1008 using hardware components such as a PE count register, a sequence controller, an incrementer or decrementer, and others. Accordingly, unlike a conventional SSD device, the SSD 1000 does not need a DRAM to store a directory of wear leveling data, which would raise the cost of the device, and increase the power consumption and size of the SSD.

Figure 11:
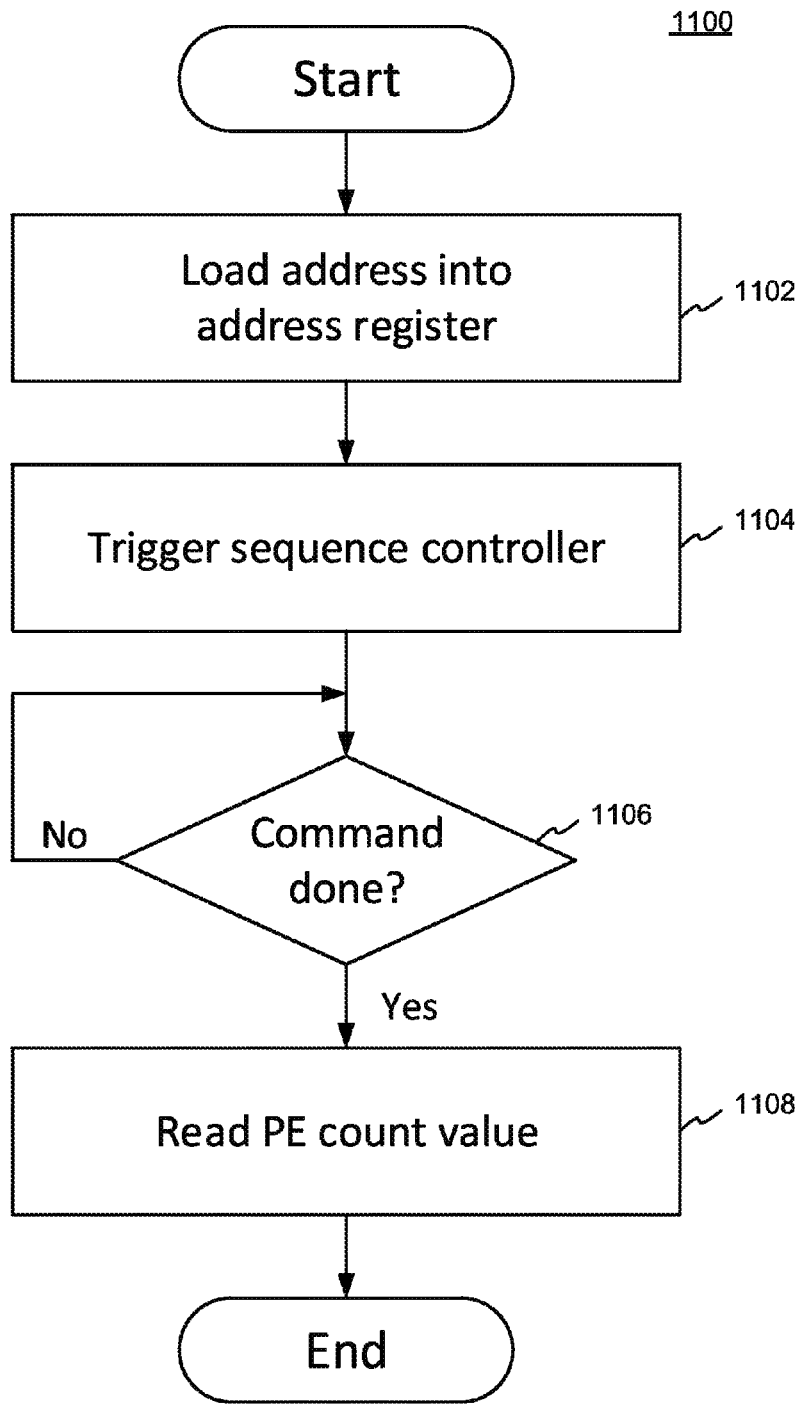
FIG. 11 illustrates a PE count read process according to an embodiment.

FIG. 11 illustrates a PE count read process 1100 according to an embodiment. The components of FIG. 4 are referenced below for illustrative convenience. At 1102, an address is loaded into the address register 414. At 1104, the sequence controller 420 is triggered to generate a PE count read command. The sequence controller 420 performs a PE count read operation on a target page identified by the address. At 1106, it is checked whether or not the PE count read command is completed by the sequence controller 420. At 1108, a current PE count value stored in the spare area 408 of the target page is read out and transmitted to the host 450 via the PE count register 430 and the host interface 412, and the PE count read process 1100 is terminated.

Figure 12:
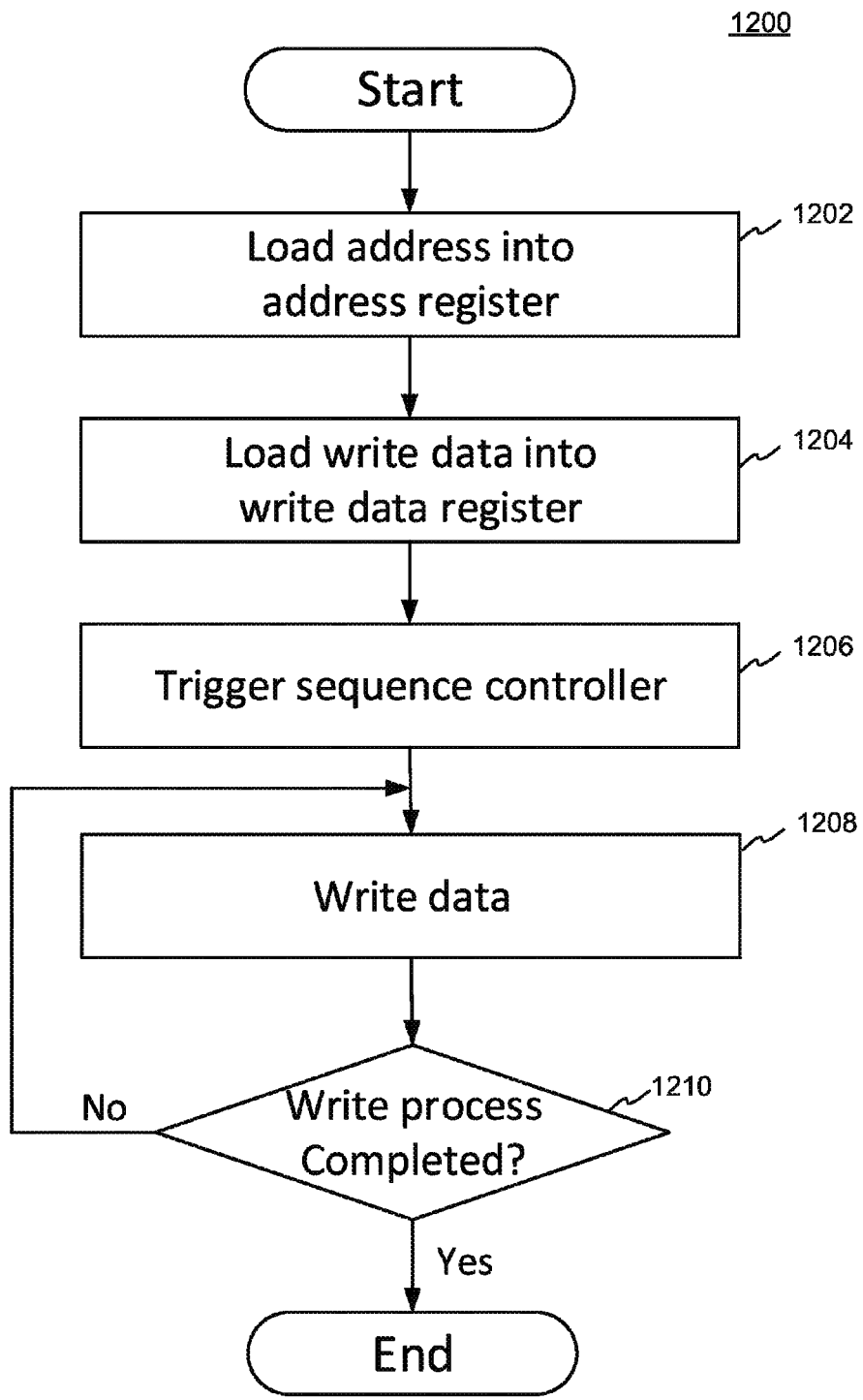
FIG. 12 illustrates a data write process according to an embodiment.

FIG. 12 illustrates a data write process 1200 according to an embodiment. The components of FIG. 4 are referenced below for illustrative convenience. As a result of the PE count read process 1100, if the PE count value is provided to the host 450, the host 450 determines the next operation based on a result of the PE count read process 1100. If the host 450 transmits a write command to the RRAM device 400, at 1202, a write address identifying the target page is loaded into the address register 414. At 1204, the write data is loaded into the write data register 422. At 1206, the sequence controller 420 is triggered to generate a write sequence. At 1208, the write data is written into memory cells of the target page. At the same time when the write data is written into the target page, a new PE count value, which has been automatically updated by the updater 432, is stored in the spare area 408 of the target page. At 1210, it is checked whether or not the data write process is completed by the sequence controller 420. If so, the data write process 1200 is terminated.

Figure 13:
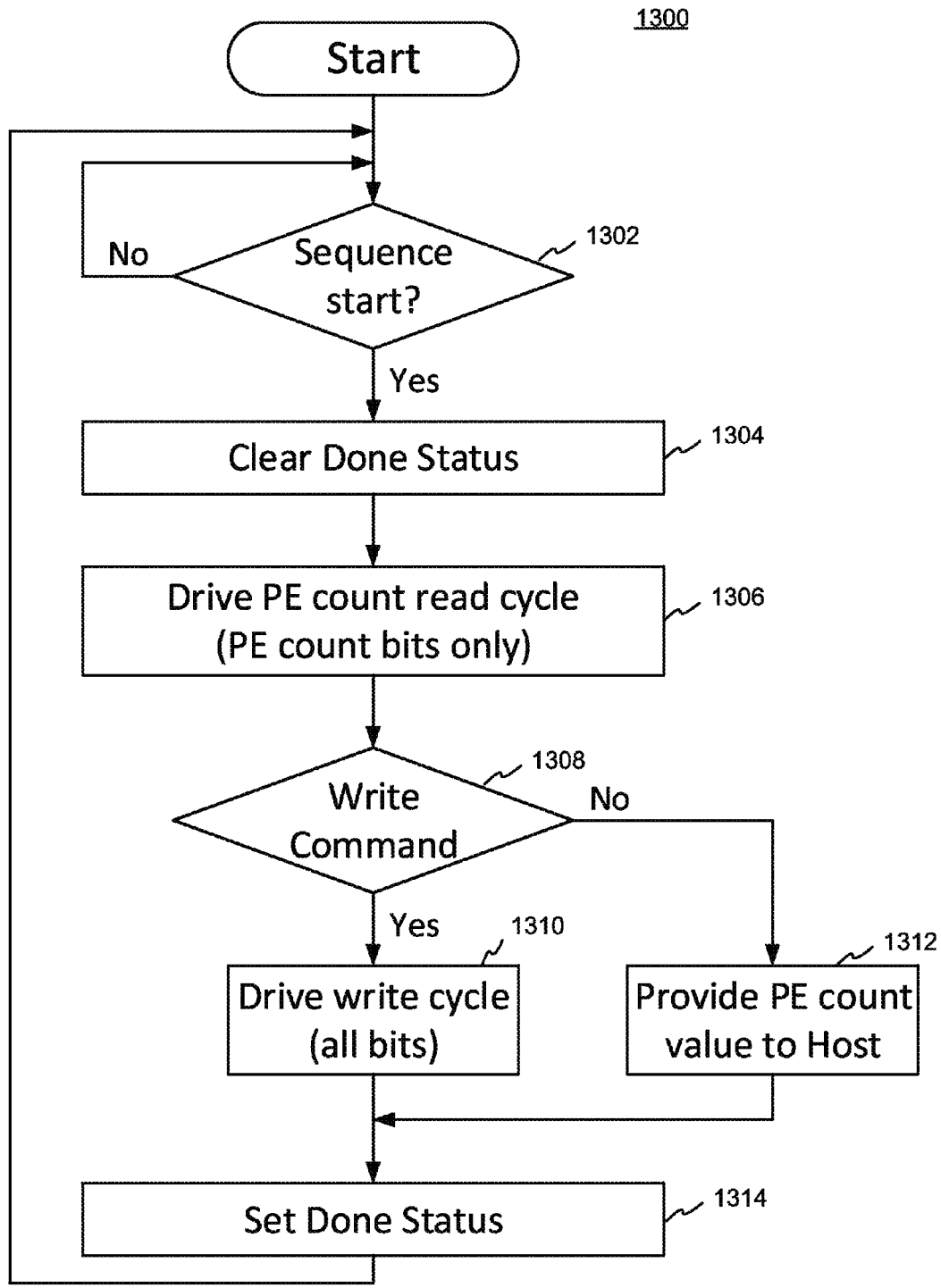
FIG. 13 illustrates a process performed by a sequence controller when the PE count read process or the data write process are performed according to an embodiment.

FIG. 13 illustrates a process 1300 performed by the sequence controller 420 when the PE count read process 1100 and the data write process 1200 are performed according to an embodiment. At 1302, it is checked to see if a request for a PE count read or data write process 1100 or 1200 has been submitted by the host 450. If so, the "complete" status is cleared before starting the PE count read process 1100 (1304). The sequence controller 420 now drives a PE count read cycle (1306) so that a current PE count value stored in the spare area 408 of the target page is retrieved.

At 1308, it is checked whether the PE count read command or the write command is received from the host 450. If the write command is received, the sequence controller 420 drives a write cycle (1310) so that the write data is written into the data area 406 of the target page, and an automatically updated PE count value is stored in the spare area 408 of the target page. After that, the "complete" status is set (1314), and the sequence controller 420 waits for the next operation, e.g., another PE count read or write process, to be performed.

If, after the checking at 1308, if there is the PE count read command provided from the host 450, the "complete" status is set without driving the write cycle. That is, at 1312, the current PE count value retrieved from the spare area 408 of the target page is provided to the host 450 via the PE count register 430 and the host interface 412 as described above with reference to FIG. 4. The sequence controller 420 waits for the next operation to be performed.

Figure 14:
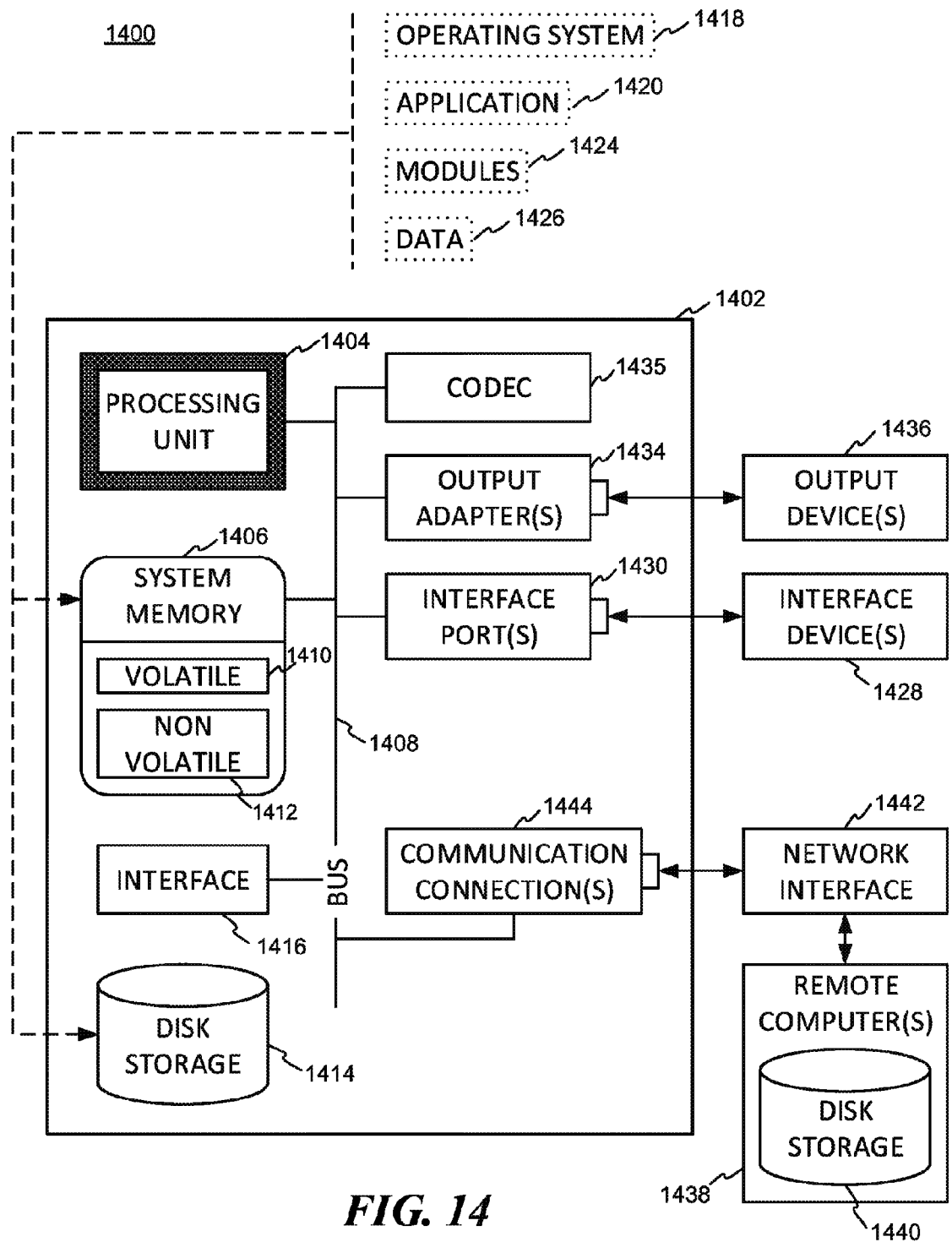
FIG. 14 illustrates a block diagram of an operating environment for facilitating implementation of one or more aspects disclosed herein.

FIG. 14 illustrates a block diagram of an operating environment for facilitating implementation of one or more aspects disclosed herein. An environment may include a computing system such as a mobile device having a touch-sensitive interface (e.g., a smartphone, a tablet), a computing device (e.g., a laptop computer, a kiosk, a smart device such as a smart meter or smart sensors), a storage device (e.g., a disk, network storage), an imaging device (e.g., a phone, a still or video camera), an audio device, a vehicle, or the like. The systems and processes described below can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders, not all of which may be explicitly illustrated herein.

With reference to FIG. 14, a suitable environment 1400 for implementing various aspects of the present invention includes a computer 1402. The computer 1402 includes a processing unit 1404, a system memory 1406, a codec 1435, and a system bus 1408. The system bus 1408 couples system components including, but not limited to, the system memory 1406 to the processing unit 1404. The processing unit 1404 can be any of various available processors. Dual microprocessors and other multiprocessor architectures also can be employed as the processing unit 1404.

The system bus 1408 can be any of several types of bus structure(s) including a memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1406 includes volatile memory 1410 and non-volatile memory 1412. The basic input/output system (BIOS), containing the basic routines to transfer information between elements within the computer 1402, such as during start-up, is stored in non-volatile memory 1412. In addition, codec 1435 may include at least one of an encoder or decoder. The encoder or decoder may consist of hardware, software, or a combination of hardware and software. Although, codec 1435 is depicted as a separate component, codec 1435 may be contained within non-volatile memory 1412. By way of illustration, and not limitation, non-volatile memory 1412 can include read only memory (ROM), programmable ROM (PROM), electrically programmable ROM (EPROM), electrically erasable programmable ROM (EEPROM), or flash memory. Volatile memory 1410 includes random access memory (RAM), which acts as external cache memory. According to an embodiment, the volatile memory may store the write operation retry logic (not shown in FIG. 14) and the like. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM).

The computer 1402 may also include a removable/non-removable, volatile/non-volatile computer storage medium. FIG. 14 illustrates, for example, a storage device 1414 (e.g., hard disk drive or solid state drive). In an embodiment, storage 1414 is implemented using a solid state drive (SSD), such as that illustrated in FIG. 10. To facilitate connection of the storage devices 1414 to the system bus 1408, a removable or non-removable interface is typically used, such as interface 1416.

It is to be appreciated that FIG. 14 describes software that acts as an intermediary between users and the basic computer resources described in the suitable operating environment 1400. Such software includes an operating system 1418. Operating system 1418, which can be stored on disk storage 1414, acts to control and allocate resources of the computer system 1402. Applications 1420 take advantage of the management of resources by the operating system 1418 through program modules 1424, and program data 1426, such as the boot/shutdown transaction table and the like, stored either in the system memory 1406 or on the disk storage 1414. It is to be appreciated that the present invention can be implemented with various operating systems or combinations of operating systems.

A user enters commands or information into the computer 1402 through input device(s) 1428. Input devices 1428 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1404 through the system bus 1408 via interface port(s) 1430. Interface port(s) 1430 include, for example, a serial port, a parallel port, a game port, and a universal serial bus (USB). Output device(s) 1436 use some of the same type of ports as input device(s) 1428. Thus, for example, a USB port may be used to provide input to the computer 1402 and to output information from the computer 1402 to the output device 1436. Output adapter 1434 is provided to illustrate that there are some output devices 1436 like monitors, speakers, and printers, among other output devices 1436, which require special adapters. The output adapters 1434 include, by way of illustration and not limitation, video and sound cards that provide a means of connection between the output device 1436 and the system bus 1408. It should be noted that other devices and/or systems of devices provide both input and output capabilities such as remote computer(s) 1438.

The computer 1402 can operate in a networked environment using logical connections to one or more remote computers, such as remote computer(s) 1438. The remote computer(s) 1438 can be a personal computer, a server, a router, a network PC, a workstation, a microprocessor based appliance, a peer device, a smart phone, a tablet, or other network node, and typically includes many of the elements described relative to the computer 1402. For convenience of description, only a memory storage device 1440 is illustrated with remote computer(s) 1438. Remote computer(s) 1438 is logically connected to the computer 1402 through a network interface 1442 and then connected via communication connection(s) 1444. Network interface 1442 encompasses wire and/or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1444 refers to the hardware/software employed to connect the network interface 1442 to the bus 1408. While communication connection 1444 is shown for illustrative clarity inside computer 1402, it can also be external to computer 1402. The hardware/software necessary for connection to the network interface 1442 includes, for example, internal and external technologies such as modems including regular telephone grade modems, cable modems and DSL modems, ISDN adapters, and wired and wireless Ethernet cards, hubs, and routers.

The illustrated aspects of the disclosure may also be practiced in distributed computing environments where certain tasks are performed by remote processing devices that are linked through a communications network. In a distributed computing environment, program modules or stored information, instructions, or the like can be located in local or remote memory storage devices.

A number of embodiments have been described. Nevertheless, it will be understood that various modifications may be made without departing from the spirit and scope of the invention. For example, the ordering of layers on the substrate could be reversed, where the top electrode is provided below the bottom electrode depending on implementation. Accordingly, the terms "top" and "bottom" should not be construed as limiting, for example, the relative positions of the source electrode that provides the filament-forming metal particles in the switching layer and an electrode provided at its opposing side. Accordingly, other embodiments are within the scope of the following claims.

What is claimed is:

1. A memory system including a memory device, the memory device comprising:
    a substrate;
    a memory array defining a plurality of physical pages, a page of the plurality of physical pages including a data area defining a first subset of the page for storing data and a spare area defining a second subset of the page for storing a program/erase (PE) count value, the PE count value indicating a number of PE cycles performed on the page; and
    a PE count circuit configured to perform a PE count read operation on a target physical page of the plurality of physical pages, wherein the PE count circuit comprises:
        a PE count register configured to retrieve and store a PE count value indicating a number of PE cycles performed on the target physical page from a spare area of the target physical page, and
        an updater configured to update the retrieved PE count value in response to implementation of a program operation or an erase operation at the target physical page, wherein the implementation of the program operation or the erase operation is in response to a result of comparing the retrieved PE count value with a threshold value; and
    wherein the memory array and the PE count circuit are formed in different layers of the substrate.

2. The memory system of claim 1, wherein the memory device further comprises:
    a control layer; and
    a memory layer provided on top of the control layer,
    wherein the PE count circuit is formed in the control layer and the memory array is formed in the memory layer.

3. The memory system of claim 1, wherein the memory array includes resistive memory cells and is a crossbar array.

4. The memory system of claim 1, wherein the memory device further comprises:
    a sequence controller configured to drive the PE count read operation upon receiving an address identifying the target physical page.

5. The memory system of claim 1, further comprising a host interface, wherein the PE count circuit performs the PE count read operation in response to receipt of address data associated with the target physical page over the host interface.

6. The memory system of claim 5, wherein the PE count circuit outputs the PE count value to the host via the host interface, wherein the host compares the retrieved PE count value with the threshold value.

7. The memory system of claim 1, wherein the PE count circuit further comprises a comparator configured to compare the retrieved PE count value with the threshold value.

8. The memory system of claim 1, wherein the updater comprises an incrementer configured to increment the retrieved PE count value by 1 in response to the memory device executing the program operation on the target physical page.

9. The memory system of claim 8, wherein the PE count value is initialized to zero, and is related to the threshold value determined based on a longevity metric associated with a memory cell in the memory array.

10. The memory system of claim 1, wherein the updater comprises a decrementer configured to decrement the retrieved PE count value by 1 in response to the memory device executing the program operation on the target physical page.

11. The memory system of claim 10, wherein the PE count value is initialized to a value corresponding to a longevity metric associated with a memory cell in the memory array, and is related to the threshold value that is set to zero.

12. The memory system of claim 1, wherein the memory system is a memory module including a plurality of packaged resistive memory cell chips, and the memory device is one of the packaged resistive memory cell chips.

13. The memory system of claim 1, wherein the memory system is a solid state drive (SSD) and the memory device is a memory module provided in the SSD.

14. The memory system of claim 1, wherein the memory array is defined by a plurality of two-terminal memory cells.

15. A memory system including a memory device, the memory device comprising:
- a memory array defining a plurality of physical pages, a page of the plurality of physical pages including a data area for storing data and a spare area for storing a program/erase (PE) count value, the PE count value indicating a number of PE cycles performed on the page; and
- a PE count circuit configured to perform a PE count read operation on a target physical page of the plurality of physical pages to retrieve the PE count value for the target physical page, wherein the PE count circuit comprises:
  - a PE count register configured to store the PE count value retrieved from the spare area of the target physical page; and
  - update logic configured to update the retrieved PE count value based on a result of comparing the retrieved PE count value with a threshold value.

16. The memory system of claim 15, wherein the PE count circuit further comprises a comparator configured to compare the retrieved PE count value with the threshold value.

17. The memory system of claim 15, wherein the memory device outputs the retrieved PE count value to the host, and wherein the host compares the retrieved PE count value with the threshold value.

18. The memory system of claim 15, wherein the update logic comprises an incrementer configured to increment the retrieved PE count value by 1 when the memory device receives a write command according to the comparison result.

19. The memory system of claim 18, wherein the PE count value is initialized to zero, and the threshold value is determined based on a maximum number of PE cycles a memory cell in the memory array can perform during its lifetime.

20. The memory system of claim 15, wherein the update logic comprises a decrementer configured to decrement the retrieved PE count value by 1 when the memory device receives a write command according to the comparison result.

21. The memory system of claim 20, wherein the PE count value is initialized to a value corresponding to a maximum number of PE cycles a memory cell in the memory array can perform during its lifetime, and the threshold value is set to zero.

* * * * *